(12) United States Patent
Kohara et al.

(10) Patent No.: US 8,202,819 B2
(45) Date of Patent: *Jun. 19, 2012

(54) CATALYST SYSTEM TO BE USED IN AUTOMOBILE EXHAUST GAS PURIFICATION APPARATUS, EXHAUST GAS PURIFICATION APPARATUS USING THE SAME AND EXHAUST GAS PURIFICATION METHOD

(75) Inventors: Akira Kohara, Osaka (JP); Yoshiro Hirasawa, Numazu (JP); Katsuaki Katoh, Numazu (JP)

(73) Assignees: Daiichi Kigenso Kagaku Kogyo Co., Ltd., Osaka-Shi (JP); N.E. Chemcat Corporation, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 12/448,667

(22) PCT Filed: Dec. 12, 2007

(86) PCT No.: PCT/JP2007/073959
§ 371 (c)(1),
(2), (4) Date: Jun. 29, 2009

(87) PCT Pub. No.: WO2008/093471
PCT Pub. Date: Aug. 7, 2008

(65) Prior Publication Data
US 2010/0061903 A1    Mar. 11, 2010

(30) Foreign Application Priority Data
Feb. 1, 2007 (JP) ................. 2007-022568

(51) Int. Cl.
*B01J 23/00*     (2006.01)
*B01J 23/10*     (2006.01)
*B01J 23/42*     (2006.01)
*B01J 23/44*     (2006.01)
*B01J 8/02*      (2006.01)
*B01J 8/00*      (2006.01)
*F02B 27/04*     (2006.01)
*F01N 3/10*      (2006.01)
*B01D 50/00*     (2006.01)
*B01D 53/56*     (2006.01)
*B01D 53/94*     (2006.01)
*B01D 53/86*     (2006.01)
*C01B 21/00*     (2006.01)
*C01B 23/00*     (2006.01)
*C01B 25/00*     (2006.01)
*C01B 31/00*     (2006.01)
*C01B 33/00*     (2006.01)
*C01B 35/00*     (2006.01)
*C01G 28/00*     (2006.01)
*C01G 30/00*     (2006.01)

(52) U.S. Cl. ........ 502/304; 502/339; 502/349; 502/325; 422/169; 422/171; 60/273; 60/299; 60/302; 423/213.5; 423/239.1

(58) Field of Classification Search ......... 502/300–355; 422/168–171; 60/299–302, 273, 274; 423/213.5, 423/239.1
See application file for complete search history.

(56) References Cited

U.S. PATENT DOCUMENTS

| | | | |
|---|---|---|---|
| 4,927,799 A | 5/1990 | Matsumoto et al. | |
| 5,376,610 A * | 12/1994 | Takahata et al. | 502/66 |
| 5,948,723 A * | 9/1999 | Sung | 502/303 |
| 6,375,910 B1 * | 4/2002 | Deeba et al. | 423/239.1 |
| 6,499,294 B1 * | 12/2002 | Katoh et al. | 60/301 |
| 6,823,662 B1 * | 11/2004 | Yamamoto et al. | 60/286 |
| 7,276,212 B2 * | 10/2007 | Hu et al. | 422/177 |
| 7,628,009 B2 * | 12/2009 | Hu et al. | 60/285 |
| 7,737,077 B2 * | 6/2010 | Kitamura et al. | 502/326 |
| 7,825,063 B2 * | 11/2010 | Takeuchi et al. | 502/302 |
| 2001/0036432 A1 * | 11/2001 | Hu et al. | 423/213.5 |
| 2003/0083193 A1 * | 5/2003 | Takaya et al. | 502/304 |
| 2007/0155624 A1 | 7/2007 | Wakita et al. | |
| 2008/0066458 A1 * | 3/2008 | Toyoda et al. | 60/299 |

FOREIGN PATENT DOCUMENTS

| | | |
|---|---|---|
| EP | 1287876 A2 | 3/2003 |
| EP | 1801074 A1 * | 6/2007 |
| JP | 06-075675 | 5/1988 |
| JP | 07-144119 | 6/1995 |
| JP | 10-192713 | 7/1998 |
| JP | 11-123331 | 5/1999 |
| JP | 2001-025645 | 1/2001 |
| JP | 2002-336703 | 11/2002 |
| JP | 2005-170774 | 6/2005 |
| WO | WO-2006/030763 | 3/2006 |

OTHER PUBLICATIONS

International Search Report dated Mar. 18, 2008, issued on PCT/JP2007/073959.

European Search Report issued in European Patent Application No. 07 859 782.0, dated Sep. 2, 2011 (corresponding to PCT/JP2007/073959).

Masui Et al., "Preparation of ceria-zirconia sub-catalysts for automotive exhaust cleaning," Journal of Alloys and Compounds, Elsevier Sequoia, Lausanne, CH, vol. 303-304, pp. 49-55, May 1, 2000.

* cited by examiner

*Primary Examiner* — Stanley Silverman
*Assistant Examiner* — Anthony J Zimmer
(74) *Attorney, Agent, or Firm* — Edwards Wildman Palmer LLP; James E. Armstrong, IV; Junko Harada

(57) ABSTRACT

A catalyst system to be used in an automobile exhaust gas purification apparatus which exerts excellent purification capability to a nitrogen oxide, even when hydrocarbon concentration varies, by subjecting exhaust gas discharged from an automotive internal engine to contacting with a catalyst, an exhaust gas purification apparatus using the same, and an exhaust gas purification method.

A catalyst system etc. to be used in an automobile exhaust gas purification apparatus, composed by using two or more exhaust gas purification catalysts, containing a first catalyst supported on an inorganic structural carrier and a second catalyst other than this, characterized by having the first catalyst supported on apart of the inorganic structural carrier positioned at the upstream side, when arranged in an exhaust gas passage; on the other hand having the second catalyst supported on a part of the inorganic structural carrier, positioned at the downstream side, when arranged in an exhaust gas passage; and containing a cerium-zirconium-type composite oxide (A) having a pyrochlore phase in the crystal structure.

17 Claims, 3 Drawing Sheets

CATALYST SYSTEM TO BE USED IN AUTOMOBILE EXHAUST GAS PURIFICATION APPARATUS, EXHAUST GAS PURIFICATION APPARATUS USING THE SAME AND EXHAUST GAS PURIFICATION METHOD

BACKGROUND OF THE INVENTION

1. Field of the Invention

The present invention relates to a catalyst system to be used in an automobile exhaust gas purification apparatus, an exhaust gas purification apparatus using the same, and an exhaust gas purification method, and in more detail, the present invention relates to a catalyst system to be used in an automobile exhaust gas purification apparatus which exerts excellent purification capability to a nitrogen oxide, even when hydrocarbon concentration varies, by subjecting exhaust gas discharged from an automotive internal engine to contacting with a catalyst, an exhaust gas purification apparatus using the same, and an exhaust gas purification method.

2. Description of the Prior Art

Exhaust gas discharged from an internal combustion engine of an automobile or the like, or a combustion engine of a boiler or the like, contains toxic substances such as a hydrocarbon (HC), carbon monoxide (CO), a nitrogen oxide ($NO_x$), and various exhaust gas purification technologies for purifying these have been proposed. As one of these, there has been studied exhaust gas purification technology for purifying toxic components in exhaust gas, by installment of a catalyst in exhaust gas passage.

In particular, in the case where exhaust gas from an automobile is purified by such catalyst technology, there has been required performance which is capable of flexibly corresponding to abrupt variation of concentration of these toxic gases (CO, HC, $NO_x$) ranging from several ppm to several %, and is capable of purifying exhaust gas in high efficiency.

In the exhaust gas purification technology used such a catalyst, oxygen present in exhaust gas has an important role of oxidizing CO and HC, as well as CO, HC etc. present in exhaust gas has an important role of promoting a reductive reaction of $NO_x$. However, in the case of an automobile, because of variation of running circumstances depending on a road jam state, it is difficult to maintain an engine combustion state constant, and oxygen concentration in exhaust gas also varies every second. Accordingly, there was a case where purification of the toxic substances by utilization of oxygen became impossible when oxygen concentration was lowered.

In order to overcome this problem, it is carried out to enhance purification capability of toxic substances, by blending an oxygen storage component (it may be referred to as the OSC material) into a composition of the exhaust gas purification catalyst, so as to supply oxygen into exhaust gas, when oxygen concentration is low.

$CeO_2$ powder has been used as the OSC material of this catalyst, because of having high storage and discharging capability of oxygen, and it has been clarified to increase exhaust gas treatment efficiency. Up to now, many investigations have been made on oxygen storage capacity, enhancement of discharging characteristics in $CeO_2$-type powder, such as a $CeO_2$—$ZrO_2$-type or the like, and on an exhaust gas purification catalyst using this as a co-catalyst.

As such an exhaust gas purification catalyst, it has been approved that a cerium-zirconium composite oxide with specific atomic ratio is effective as an oxygen storage component for the exhaust gas purification catalyst, to adjust oxidizing action of HC and Co in exhaust gas, or reducing action of $NO_x$.

In addition, in the case of an exhaust gas purification catalyst to be mounted on an automobile, there are two types, that is, one installed under a floor where temperature is relatively low, and what is called a just-under-type, installed at a position exposed to high temperature exhaust gas, just after discharged from an engine. However, even exhaust gas, whose temperature was high just after discharged from an engine, temperature thereof becomes further lower till reaching under the floor. Because an exhaust gas purification catalyst generally exerts high activity at higher temperature than a certain level, in many cases, this state is not a preferable condition to purification of exhaust gas. However, a catalyst to be used as the under-the-floor type is required to exert purification capability, even at such a low temperature state.

On the other hand, the just-under-type may encounter a case where temperature of exhaust gas exceeds 1000° C., which may incur sintering of exhaust gas purification catalyst components. Therefore, the exhaust gas purification catalyst is required to have performance for suppressing sintering of the catalyst components and purifying stably the exhaust gas, even under strict condition at such high temperature.

As the automobile exhaust gas purification catalyst, a catalyst for carrying out oxidation of CO and HC, and reduction of $NO_x$, at the same time by a single catalyst, has been known as a three way catalyst (TWC) (hereafter the automobile exhaust gas purification apparatus using the TWC may be referred to as the TWC apparatus). A constitution of this TWC is generally, for example, one where a structural type carrier composed of cordierite is coated with slurry in which noble metal elements such as platinum, rhodium and palladium is supported on a base material of a porous carrier composed of alumina.

In such a TWC, it is generally carried out oxidative removal of reducing components such as CO, HC by a reaction with oxygen in exhaust gas, or reductive purification of $NO_x$ by utilization of CO, HC etc. in exhaust gas, however, as described above, because oxygen concentration in exhaust gas discharged from an automobile varies every second, a catalyst exerting purification capability, even under such environment, has been required. Under such circumstances, it has been carried out to enhance purification capability of toxic components, by formulating a cerium oxide or a cerium-zirconium-type composite oxide (Patent Literature 1) into a composition of an exhaust gas purification catalyst as oxygen storage and discharge material, and supplying an oxygen into exhaust gas when oxygen concentration decreases, mainly aiming at buffering of such variation of oxygen concentration in exhaust gas.

In addition, there have been proposed an exhaust gas purification catalyst (Patent Literature 2) having excellent ignition performance at low temperature that expresses catalytic action at low temperature, which is a catalyst including catalytically activated components containing the noble metal components, the refractory inorganic oxides, and the zirconium oxides containing cerium and additives, wherein crystal of the zirconium oxide containing cerium and the additives has a single structure of a tetragonal structural type zirconium oxide; still more an exhaust gas purification catalyst (Patent Literature 3) having both large specific surface area and high oxygen storage and discharge capability, which is a composite oxide of $CeO_2$ and $ZrO_2$, having any one or more kind of a pyrochlore phase, a K-phase or an intermediate phase thereof.

However, with tightening of exhaust gas regulations in recent years, the market has required the OSC material which is capable of discharging oxygen at low temperature region, and has higher oxygen storage and discharging capability and long life catalyst performance, therefore, an exhaust gas purification catalyst with excellent resistance to high temperature has been desired. Under these circumstances, the present inventors have developed the OSC material having excellent performance even at high temperature, and have proposed a cerium-zirconium composite oxide not being sintered, even at a high temperature of 1000° C. or higher (refer to Patent Literature 4).

In addition, in the automobile exhaust gas purification apparatus, there may be the case where a catalyst having function corresponding to exhaust gas components of a purification subject is arranged at a plurality of places of exhaust gas passages, and constitutes the exhaust gas purification apparatus.

Also in a gasoline engine, it is often carried out to arrange two or more TWCs themselves in an exhaust gas passage. For example, there have been investigations to completely oxidize partially oxidized HC, by arrangement of a high heat resistant catalyst at the former stage which is exposed to high temperature exhaust gas, while by arranging the usual TWC at the later stage (Patent Literature 5); and to enhance largely HC purification rate in exhaust gas, by arrangement of the TWC at the former stage, and by arrangement of a composite catalyst compounded of an HC absorbing agent and the TWC at the later stage (Patent Literature 6).

In addition, in the case where a catalyst is arranged in an exhaust gas passage with limited space and shape, in order to obtain sufficient activated surface for exhaust gas purification, there may be the case where the same kind of TWCs are arranged dividedly at two or more places. Patent Literature 6 is the case of exhaust gas purification by the TWC apparatus constituted by using two or more catalysts.

In addition, in the conventional TWC, it has been considered that theoretical air/fuel ratio, called a window, is required to be an extremely narrow range of near 14.6, to make possible suitable purification of three components of HC, CO and $NO_x$. However, in an automobile, due to increased concern to an environmental problem in recent years, in addition to the above running condition, it is inevitable to operate in a lean state such as fuel cut (to stop temporarily fuel supply into a combustion chamber), lean combustion (it may be referred to also as lean burn), in order to enhance fuel economy. Such a state of large theoretical air/fuel ratio results in increase in $NO_x$ generation amount, and purification thereof was difficult by the conventional TWC.

In addition, also from a view point of an oil resource depletion issue and a global warming issue, attainment of low automotive fuel cost has been expected, and concern to a lean combustion engine has been increased also in a gasoline automobile. In the lean combustion, exhaust gas atmosphere in running becomes oxygen excess atmosphere (hereafter may be referred to as "lean atmosphere"), as compared with theoretical air/fuel ratio (hereafter may be referred to as a "stoichiometric state"). In the case where the conventional TWC is used in the lean atmosphere, there was a problem that a large quantity of $NO_x$ is discharged, due to influence of excess oxygen, resulting in insufficient purification action. Therefore, there has been investigated on a catalyst which is capable of purifying $NO_x$ even under the lean atmosphere (Patent Literature 7).

However, there has been ever increasing strict request for enhancement of automotive fuel economy in recent years, and frequency of operation under the lean atmosphere or fuel cut has been increasing, however, degree of severity in request to $NO_x$ purification has been increasing also, with increase in environmental consciousness, and in particular, still more improvement of $NO_x$ purification performance of the TWC has been desired.

[Patent Literature 1] JP-B-6-75675
[Patent Literature 2] JP-A-2002-336703
[Patent Literature 3] JP-A-2005-170774
[Patent Literature 4] WO2006/030763
[Patent Literature 5] JP-A-11-123331
[Patent Literature 6] JP-A-7-144119
[Patent Literature 7] JP-A-10-192713, paragraph [0002]

SUMMARY OF THE INVENTION

It is an object of the present invention, in view of the above problems, to provide a catalyst system to be used in an automobile exhaust gas purification apparatus which exerts excellent purification capability to a nitrogen oxide, even when hydrocarbon concentration varies, by subjecting exhaust gas discharged from an automotive internal engine to contacting with a catalyst, an exhaust gas purification apparatus using the same, and an exhaust gas purification method.

The present inventors have intensively studied a purification catalyst of a nitrogen oxide ($NO_x$) in exhaust gas, to attain the above-described objects, and as a result, have found that a catalyst containing fine powder of the cerium-zirconium-type composite oxide, which contains the pyrochlore phase in the crystal structure and has small specific surface area, has excellent characteristics to decompose $NO_x$ efficiently, and have confirmed that CO and HC in exhaust gas can be purified with $NO_x$ at the same time, by using this as a downstream side catalyst of the automobile exhaust gas purification apparatuses arranged at the upstream side, which is a former stage of an exhaust gas passage, along with at the downstream side, which is the later stage, and have thus completed the present invention.

That is, according to a first aspect of the present invention, there is provided a catalyst system to be used in an automobile exhaust gas purification apparatus, composed by using two or more exhaust gas purification catalysts, containing a first catalyst supported on an inorganic structural carrier, and a second catalyst other than this, characterized by;
having the first catalyst supported on a part of the inorganic structural carrier positioned at the upstream side, when arranged in an exhaust gas passage;
on the other hand, having the second catalyst supported on a part of the inorganic structural carrier positioned at the downstream side, when arranged in an exhaust gas passage; and
containing a cerium-zirconium-type composite oxide (A) having a pyrochlore phase in the crystal structure.

In addition, according to a second aspect of the present invention, there is provided the catalyst system in the first aspect, characterized in that the first catalyst and the second catalyst are arranged adjacently.

Still more, according to a third aspect of the present invention, there is provided the catalyst system in the first aspect, characterized in that the first catalyst and the second catalyst have function to reduce a nitrogen oxide ($NO_x$) by a hydrocarbon (HC) or carbon monoxide (CO) or hydrogen (H).

In addition, according to a fourth aspect of the present invention, there is provided the catalyst system in the first aspect, characterized in that particle size of the cerium-zirconium-type composite oxide (A) is equal to or smaller than 3 mm.

In addition, according to a fifth aspect of the present invention, there is provided the catalyst system in the first aspect, characterized in that cerium and zirconium of the cerium-zirconium composite oxide (A) is contained in a ratio of $CeO_2/(ZrO_2+CeO_2)=1/9$ to 9/1, based on molar ratio as converted to an oxide.

In addition, according to a sixth aspect of the present invention, there is provided the catalyst system in the first aspect, characterized in that the cerium-zirconium composite oxide (A) has a specific surface area of equal to or smaller than 20 $m^2/g$, when average particle size is 1 to 100 μm.

In addition, according to a seventh aspect of the present invention, there is provided the catalyst system in the first aspect, characterized in that the second catalyst further contains one or more kind of active metal species (B) selected from platinum, palladium or rhodium.

In addition, according to an eighth aspect of the present invention, there is provided the catalyst system in the seventh aspect, characterized in that the active metal species (B) are supported on a heat resistant inorganic oxide (C) containing one or more kind selected from zirconia, the cerium-zirconium composite oxide, ceria, γ-$Al_2O_3$, or lanthanum-added γ-$Al_2O_3$.

In addition, according to a ninth aspect of the present invention, there is provided the catalyst system in the eighth aspect, characterized in that the active metal species (B) contain platinum, while the heat resistant inorganic oxide (C) is composed of lanthanum-added γ-$Al_2O_3$.

In addition, according to a tenth aspect of the present invention, there is provided the catalyst system in the first aspect, characterized in that the inorganic structural carrier is a honeycomb structure (D).

In addition, according to the eleventh aspect of the present invention, there is provided the catalyst system in the tenth aspect, characterized in that the second catalyst is covered as at least two layers on the honeycomb structure (D), and the cerium-zirconium composite oxide (A) is supported on the lower layer.

In addition, according to a twelfth aspect of the present invention, there is provided the catalyst system in the tenth or the eleventh aspect, characterized in that the honeycomb structure (D) is a flow-through-type carrier with a cell density of 10 to 1500 cell/$inch^2$.

In addition, according to a thirteenth aspect of the present invention, there is provided the catalyst system in any one of the first to twelfth aspects, characterized in that each component of the second catalyst is 5.0 to 200 g/L of the cerium-zirconium-type composite oxide (A), 0.01 to 20 g/L of the active metal species (B) and 1 to 300 g/L of the heat resistant inorganic oxide (C), based on unit volume of the honeycomb structure (D).

In addition, according to a fourteenth aspect of the present invention, there is provided the catalyst system in the first aspect, characterized in that the first catalyst is a cerium-zirconium-type composite oxide (A') with a structure of a cubic crystal and/or a tetragonal structure, substantially not containing a pyrochlore phase.

In addition, according to a fifteenth aspect of the present invention, there is provided the catalyst system in the fourteenth aspect, characterized in that specific surface area of the cerium-zirconium-type composite oxide (A') is 10 to 300 $m^2/g$.

In addition, according to a sixteenth aspect of the present invention, there is provided the catalyst system in the fourteenth or fifteenth aspect, characterized in that the first catalyst further contains one or more kind of active metal species (B) selected from platinum, palladium or rhodium.

In addition, according to a seventeenth aspect of the present invention, there is provided the catalyst system in the sixteenth aspect, characterized in that the active metal species (B) are supported on a heat resistant inorganic oxide (C) containing one or more kind selected from zirconia, γ-$Al_2O_3$, or lanthanum-added γ-$Al_2O_3$.

In addition, according to an eighteenth aspect of the present invention, there is provided the catalyst system in any one of the fourteenth to seventeenth aspects, characterized in that each component of the first catalyst is 5.0 to 200 g/L of the cerium-zirconium-type composite oxide (A'), 0.01 to 20 g/L of the active metal species (B) and 1 to 300 g/L of the heat resistant inorganic oxide (C), based on unit volume of the honeycomb structure (D).

In addition, according to a nineteenth aspect of the present invention, there is provided an automobile exhaust gas purification apparatus composed by using the catalyst system in any one of the first to eighteenth aspects.

In addition, according to a twentieth aspect of the present invention, there is provided an exhaust gas purification method characterized by decomposing a nitrogen oxide ($NO_x$) contained in exhaust gas, by using the automobile exhaust gas purification apparatus in the nineteenth aspect, and by subjecting exhaust gas of an internal combustion engine to sequential contacting with catalysts arranged at least at two places of the upstream side and a downstream side of an exhaust gas passage.

In addition, according to a twenty-first aspect of the present invention, there is provided the exhaust gas purification method in the twentieth aspect, characterized in that the nitrogen oxide ($NO_x$) is reduced by hydrogen (H) generated by a steam reforming reaction or a water gas shift reaction, derived from a hydrocarbon (HC) or carbon monoxide (CO).

Still more, according to a twenty-second aspect of the present invention, there is provided the exhaust gas purification method in the twentieth aspect, characterized in that the internal combustion engine is a gasoline engine.

According to the automobile exhaust gas purification apparatus of the present invention, $NO_x$ in automobile exhaust gas can be purified efficiently. In addition, under environment where HC concentration varies, it is possible to purify HC, CO and $NO_x$, which are toxic substances in exhaust gas, and in particular, when it is used as the TWC, it exerts excellent purification performance to $NO_x$. In the case where an internal engine is operated in a lean state due to fuel cut or the like, this $NO_x$ purification capability is exerted significantly to purification of $NO_x$ generating in a large quantity just after the operation.

DETAILED DESCRIPTION OF THE INVENTION

Explanation will be given next on a catalyst system to be used in an automobile exhaust gas purification apparatus, an exhaust gas purification apparatus using the same, and an exhaust gas purification method, of the present invention, with reference to drawings.

1. The Automobile Exhaust Gas Purification Apparatus

The catalyst system to be used in the automobile exhaust gas purification apparatus of the present invention is a catalyst system composed by using two or more exhaust gas purification catalysts containing a first catalyst supported on an inorganic structural carrier and a second catalyst other than this, characterized by having the first catalyst supported on a part of the inorganic structural carrier positioned at the upstream side, when arranged in an exhaust gas passage; on the other hand having the second catalyst supported on a part of the inorganic structural carrier positioned at the downstream side, when arranged in an exhaust gas passage; and containing a cerium-zirconium-type composite oxide (A) having a pyrochlore phase in the crystal structure.

It should be noted that the inorganic structural carrier in the present invention means silica, alumina, silicon carbide, cordierite etc., formed in a honeycomb or pellet shape, and in particular, one formed in a honeycomb shape is called a one-piece structure-type carrier, and this one-piece structure-type carrier covered with the catalyst components may be called a one-piece structure-type catalyst.

Figure 1:
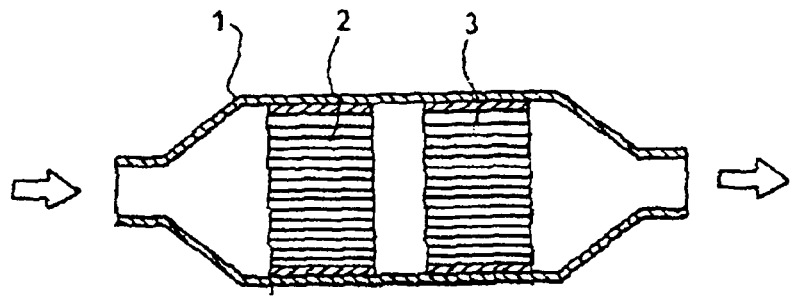
FIG. 1 is an explanation drawing showing a cross-section of the automobile exhaust gas purification apparatus of the present invention.

FIG. 1 shows a general automobile exhaust gas purification apparatus (1), and in the case of purification of exhaust gas discharged from an automobile, the structure-type catalyst (in particular, the one-piece structure-type catalyst) is arranged at a discharge passage of the exhaust gas. In the present invention, there is arranged an exhaust gas purification catalyst such as two or more catalysts having purification function of a nitrogen oxide ($NO_x$) containing the first catalyst (2) at the upstream side and the second catalyst (3) at the downstream side in an exhaust gas passage.

Position where the one-piece structure-type catalyst is arranged may be any of near an exhaust part of an engine where exhaust gas temperature becomes relatively high (a just-under-type), or further downstream side thereof (an under-the-floor-type). The exhaust gas purification catalyst of the present invention may be used as any of the just-under-type and the just-under-the-floor-type, however, the catalyst apparatus of the present invention is capable of exerting effect thereof, even at relatively low catalyst temperature such as in the under-the-floor-type. Because a catalyst containing the cerium-zirconium-type composite oxide (A) is not arranged at the most upstream side of exhaust gas but arranged at the second position, or further downstream side relative to exhaust gas flow, in any of the just-under-type and the under-the-floor-type, it is called the second catalyst or the downstream side catalyst. On the other side, a catalyst arranged at the most upstream side of exhaust gas is called the first catalyst or the upstream side catalyst.

As environment where the automobile exhaust gas purification apparatus of the present invention is used, there is purification of exhaust gas components discharged from a usual gasoline engine, and as toxic substances contained in exhaust gas components discharged from such a gasoline engine, CO, HC and $NO_x$ are major subjects for regulations. By application of the present invention to such exhaust gas, the toxic substances are purified.

Explanation will be given below mainly on the TWC for purification treatment of CO, HC and $NO_x$ at the same time, which is a preferable embodiment of the present invention. In the TWC, as shown in FIG. 1, it is desirable that the catalyst 3 at the downstream side is arranged adjacent to the catalyst 2 at the upstream side. In addition, in the TWC, a nitrogen oxide ($NO_x$) in exhausted gas is reduced by hydrocarbon (HC), carbon monoxide (CO) or hydrogen (H) generated by a steam reforming reaction.

The automobile exhaust gas purification apparatus of the present invention exerts effect in exhaust gas purification, in particular, in purification of $NO_x$ in exhaust gas, of an internal engine driven under repeated variation of air/fuel ratio. In addition, in order to enhance fuel economy in an automobile, fuel cut is carried out, and in this case, it has been known that air/fuel ratio is increased in an internal combustion engine, resulting in generation of a large quantity of $NO_x$. The automobile exhaust gas purification apparatus of the present invention exerts effect, in particular, in $NO_x$ purification performance just after such fuel cut, and is capable of extremely reducing discharge amount of $NO_x$. Such $NO_x$ purification characteristics are exerted extremely to purification of exhaust gas in fuel cut in an gasoline automobile. Reason for exerting such effect is not certain, however, it is considered as follows.

Usually, in an automobile, concentrations of toxic substances such as HC, CO, $NO_x$ in exhaust gas vary, depending on running circumstances of the automobile. In this case, purification of $NO_x$ requires HC or CO of a reducing component in exhaust gas, or hydrogen (H) generating by a steam reforming reaction, however, because the drive in a lean state caused by fuel cut increases $NO_x$ or oxygen, and reduces concentrations of also HC, CO and H of reducing components, it may incur insufficient purification and increased discharging amount of $NO_x$.

However, in the automobile exhaust gas purification apparatus of the present invention, because of buffering of abrupt variation of exhaust gas concentrations by a catalyst arranged at the upstream side, that is, even when $NO_x$ or oxygen increases, concentrations of HC and C of reducing components, do not decrease so much, it is considered one factor to promote purification of exhaust gas, in particular, purification of $NO_x$.

In this way, in the automobile exhaust gas purification apparatus of the present invention, a catalyst containing the cerium-zirconium-type composite oxide (A) is arranged as the second catalyst at the downstream side of an exhaust gas passage. That is, the catalyst containing the cerium-zirconium-type composite oxide (A) exerts more excellent purification performance, when the upper stream side catalyst is arranged, as the first catalyst, at the former stage, as compared with use thereof singly.

2. The Second Catalyst

In the present invention, the second catalyst, arranged at the downstream side of exhaust gas flow, contains the cerium-zirconium-type composite oxide (A) having a pyrochlore phase in the crystal structure, and is supported on an inorganic structural carrier.

This second catalyst is one having a fundamental constitution of the catalyst activated species (B) selected from platinum, palladium and rhodium, and the heat resistant inorganic oxide (C) containing alumina, titania, zirconia or the like, for supporting at least a part of the catalyst activated species, in addition to the cerium-zirconium-type composite oxide (A) containing a pyrochlore phase in the crystal structure. And they are supported on the one-piece structural type carrier (D), which is an inorganic structural carrier. It should be noted that into the cerium-zirconium-type composite oxide (A) containing the pyrochlore phase in the crystal, a cerium-zirconium-type composite oxide (A') with a structure of a cubic crystal and/or a tetragonal structure, substantially not containing a pyrochlore phase may also be mixed, as long as not to impair objects of the present invention.

(A) The Cerium-Zirconium-Type Composite Oxide

The cerium-zirconium-type composite oxide to be used in the present invention is one containing the pyrochlore phase in the crystal structure.

The pyrochlore structure is one generally represented by a chemical formula, $A_2B_2O_7$, provided that B represents a transition metal element, where atoms (A, B) having a spin form a regular tetrahedron network, and because a lattice of the regular tetrahedron takes a regular triangle as a motif, it has a structure generating a spin frustration state, where direction of one spin is not determined among spins positioned at the peaks of the regular triangle, when magnetic interaction between most adjacent atoms is antiferromagnetism. Long-distance order of the lattice is suppressed by this structure, and a new ground state, which has an effective quantum fluctuation, is expected. Here, the atoms A and B are constituted by combination of $A^{3+}/B^{4+}$ or $A^{2+}/B^{5+}$, and the pyrochlore structure is expressed when ion radius of A is relatively small.

In exhaust gas discharged from an internal combustion engine, oxygen concentration varies depending on variation of an operation state. Accordingly, there is generated a valence change like $Ce^{3+}$ and $Ce^{4+}$ in the Ce/Zr-type composite oxide to be used in an exhaust gas purification catalyst. This suggests possibility of variation in a crystal structure. However, in many cases, variation of such a crystal structure in the Ce/Zr-type composite oxide is a reversible one.

The reversible change of this crystal structure is considered to be similar also in the Ce/Zr-type composite oxide having the pyrochlore phase of the present invention. Therefore, even if the Ce/Zr-type composite oxide to be used in the present invention may take temporarily a crystal structure other than the pyrochlore phase, as a raw material or in the catalyst composition, it is no problem as long as it has the pyrochlore phase in environment to be used as the catalyst system of the present invention.

It has been known that a cubic crystal having the pyrochlore phase is constituted by various elements having oxygen and transition metals as key materials. It is similar also in the Ce/Zr-type composite oxide having the pyrochlore phase to be to be used in the present invention, and a part of the composition elements may be substituted with a rare earth element, a transition metal, an alkali metal, an alkaline earth metal or the like. However, in any of the cases, Ce and Zr should be included as essential composition elements. It should be noted that it is natural that the Ce/Zr-type composite oxide having the pyrochlore phase to be to be used in the present invention may be $Ce_2Zr_2O_7$, which is a compound substantially composed of Ce/Zr/O only.

It should be noted that difference between Ce/Zr having the pyrochlore phase of the present invention and Ce/Zr of a cubic crystal is as follows: In the case of a Ce/Zr elementary substance, difference of a crystal structure thereof can be clarified by measurement with an X-ray diffraction method, whereas in the case where Ce/Zr is formulated in the catalyst composition, presence or absence of the formulation can be specified also by a SEM-EBSP method. Here, SEM-EBSP in the SEM-EBSP method is an abbreviation of "Scanning Electron Microscope-Electron Backscattered Diffraction Pattern", and it has been widely known as an effective tool to observe size, shape and direction of each crystal of several-micron unit, one by one. The principle is to utilize phenomenon of forming a specific diffraction image by inversion/ diffraction of electron beams in a sample and then by back scattering, when electron beams are irradiated with SEM onto a crystalline sample.

In addition, in the present invention, one of the characteristics of the cerium-zirconium composite oxide (A) is to have a small specific surface area, and the specific surface area is equal to or smaller than $20\ m^2/g$, in particular, 0.1 to $20\ m^2/g$ when average particle size is 1 to 100 μm. The specific surface area over $20\ m^2/g$ not only provides insufficient heat resistance but also does not exert expected $NO_x$ purification performance, in some times.

Then, description will be given on one example of a production method for the cerium-zirconium-type composite oxide, which will be a catalytic component in the present invention, with reference to FIG. 2, however, the cerium-zirconium-type composite oxide to be used in the present invention should not be limited thereby.

A cerium raw material to be used in the present invention is not especially limited, however, it is preferable to be cerium oxide. This cerium oxide may be an oxide obtained from a nitrate, a carbonate, a sulfate, an acetate, a chloride, a bromide or the like. In addition, a zirconium raw material to be used in the present invention is also not especially limited, however, it is preferable to be a zirconium element material containing zirconium oxide such as baddeleyite, desilicated zirconia, zirconium oxide. Here, zirconium oxide may be an oxide obtained from a nitrate, a carbonate, a sulfate, an acetate, a chloride, a bromide or the like. In addition, the cerium raw material and the zirconium raw material may be a mixture of these raw materials or a composite oxide. It should be noted that purity of the cerium raw material and the zirconium raw material is not especially limited, however, it is preferable to be equal to or higher than 99.90.

The element materials to be used in the present invention may be any one as long as at least one of them is melted, when the element materials are heated in a production step of a composite oxide shown below. The cerium raw material and the zirconium raw material are preferably oxides. It is known that melting point of cerium oxide is 2200° C., and melting point of zirconium oxide is 2720° C. Thus, the oxide of the element material has high melting point, however, in the case where cerium oxide and zirconium oxide are used as the element materials, there may be the case where a melting state can be obtained, even at lower heating temperature than melting point of the oxide, because of influence of melting point depression. Small amount of a nitrate, a carbonate, a sulfate, a chloride, a bromide of cerium or zirconium may be formulated into these raw materials. Formulation of such a raw material compound other than the oxide may promote melting in the production step, in some cases.

In addition, in order to decrease the melting point, a third component such as trace amount of flux may be formulated, in some cases. Melting point of the raw material mixture where these element materials are mixed, differs depending on molar ratio of ceria/zirconia, and specifically, it is about 2600° C. for the case of $CeO_2/ZrO_2$ (molar ratio)=1/9, about 2200° C. for the case of the molar ratio=5/5 and about 2000° C. for the case of the molar ratio=9/1.

In the case where materials other than the cerium element material and the zirconium element material are used in combination as the third component, an alkali metal, an alkaline earth metal, other metal components may be added, as long as it is in a range not to impair characteristics of the OSC material to be obtained by the present invention. In more specifically, potassium, rubidium, cesium, magnesium, calcium, strontium, barium, antimony, hafnium, tantalum, rhenium, bismuth, praseodymium, neodymium, samarium, gadolinium, holmium. thulium, ytterbium, germanium, selenium, cadmium, indium, scandium, titanium, niobium, chromium, iron, silver, rhodium, platinum etc. are included. In addition, such a third component may be included by being derived from impurities in the cerium element material and the zirconium element material. However, it is natural that in the case where such a third component is a toxicity regulation subject, it is desirable to reduce amount thereof, or remove them.

The above cerium raw material and the zirconium raw material are mixed in predetermined ratio, and then charged into a melting apparatus. Content of cerium and zirconium of the cerium-zirconium-type composite oxide obtained in this way is not especially limited, however, $[CeO_2/(ZrO_2+CeO_2)]$ is 1/9 to 9/1, and still more preferably 2/3 to 3/2, based on molar ratio. Such a composition ratio is capable of providing excellent oxygen occlusion and discharging performance, and heat resistance.

After that, the raw material mixture is melted in the apparatus, and the melting method is not especially limited, as long as it is a method for melting at least one kind of the raw material mixture, and an arc-type, a high frequency thermal plasma-system or the like are exemplified. Among others, a general electric melting method, that is, a melting method using an arc-type electric furnace may preferably be utilized.

In the case of the melting method using the arc-type electric furnace, predetermined amount of coke is added, as an electrically conductive material, to promote initial energization, if necessary, to the mixed cerium raw material and the zirconium raw material, although it depends on mixing ratio of the cerium raw material and the zirconium raw material. Subsequently, for example, it is subjected to heating under condition of a secondary voltage of 70 to 100 V, an average load electric power of 80 to 100 kW, and a temperature of equal to or higher than 2400° C. It is desirable that the raw material mixture of the cerium-zirconium-type composite oxide (A) is melted under heating for 0.5 to 3 hours. By maintaining the raw material for equal to or longer than 0.5 hour, after reaching a molten state, uniform melting can be attained. Heating temperature may be any level as long as it is equal to or higher than 2000° C., however, it is preferable to be equal to or higher than melting point of the raw materials, in particular, 2600 to 2800° C. Holding time in a molten state is preferably set for 1 to 2 hours. It should be noted that atmosphere in melting is not especially limited, and in addition to air atmosphere, inert gas atmosphere such as in nitrogen, argon, helium may be employed. In addition, pressure is not especially limited, and any of a normal pressure state, a pressurized state and a reduced pressure state may be employed, however, usually a normal pressure state may be employed.

After completion of the melting, by covering the electric furnace with a carbon lid, and by gradually cooling for 20 to 30 hours, an ingot is obtained. A cooling method for the molten substance is not especially limited, however, usually, the ingot is taken out from the melting apparatus to be subjected to standing to cool in air so as to attain equal to or lower than 100° C., and preferably equal to or lower than 50° C. In this way, the ingot of the cerium-zirconium-type composite oxide can be obtained, where the cerium raw material and the zirconium raw material become uniform.

The ingot after melting is then crushed. A crushing method for the ingot is not especially limited, however, it is desirable to be crushed so that particle size of the cerium-zirconium-type composite oxide (A) is equal to or smaller than 3 mm. The ingot may be crushed with a crusher such as a jaw crusher or a roll crusher or the like. In consideration of handling at the latter steps, it is preferable to crush and classify the ingot so as to become powder with a size of equal to or smaller than 1 mm.

It should be noted that the resulting powder is charged into the electric furnace or the like, if necessary, after separation of impurities and the like by magnetic separation, to remove the strain inside a suboxide in the melting step or a crystal by super-cooling, by an oxidative firing. Condition of the oxidative firing is not especially limited as long as it is condition enabling oxidation of the ingot or powder, however, usually the firing can be attained at 100° C. to 1000° C., and preferably at 600° C. to 800° C. In addition, firing time is not especially limited, however, 1 to 5 hours, and preferably 1 to 3 hours may be employed.

Powder obtained by the above method may be subjected to still more fine crushing, corresponding to applications. The fine crushing is not especially limited, however, it may be attained with a crusher such as a planet mill, a ball mill, a jet mill for 5 to 30 minutes. It is preferable that the cerium-zirconium-type composite oxide has an average particle size of 0.3 to 2.0 μm, in particular, 0.5 to 1.5 μm, by this fine crushing. Although detailed reason is not clear, it is considered that increased surface area of the composite oxide by fine crushing enables to discharge a large quantity of oxygen at a low temperature region. It should be noted that the average particle size may be analyzed with a laser diffraction scattering apparatus or the like.

In this way, the cerium-zirconium composite oxide (A) containing cerium and zirconium in a ratio of $CeO_2/(ZrO_2+CeO_2)$=1/9 to 9/1, based on molar ratio as converted to an oxide can be obtained.

The cerium-zirconium-type composite oxide (A) was subjected to a durability test under heating to measure structure change before and after the test, with an X-ray diffraction apparatus (XRD). Because waveforms of this cerium-zirconium-type composite oxide at the main peak (it corresponds to $Zr_{0.5}Ce_{0.5}O_2$) after firing in high temperature air at 1050° C. and 1150° C., overlapped similarly, it was clear to have sufficient thermal stability, as well as because the main peak is extremely sharp, it was clear to have a large crystal structure.

On the other hand, by using a conventional sample not melted under heating at a high temperature of equal to or higher than meting point of the raw material mixture, described in the above Patent Literature 1 or the like, a durability test under heating was carried out to measure structure change before and after the test, with the X-ray diffraction apparatus (XRD). In the conventional sample, because a main peak (it corresponds to $Zr_{0.5}Ce_{0.5}O_2$) to be observed after firing in high temperature air of 1050° C. and 1150° C., became sharp gradually, it was found that change of a physical state in durability at high temperature was significant, and thermal stability was clearly inferior, as compared with the cerium-zirconium-type composite oxide relevant to the present invention.

(A') The Cerium-Zirconium-Type Composite Oxide

In the present invention, a cerium-zirconium-type composite oxide (A') with a structure of a cubic crystal and/or a tetragonal structure substantially not containing a pyrochlore phase may have the same composition elements as the above cerium-zirconium-type composite oxide (A), and may be different only in the crystal structure. In addition, it may be different in presence or absence of trace amount elements. In particular, one with a specific surface area of the composite oxide (A') of 10 to 300 m$^2$/g is preferable. One with the specific surface area of below 10 m$^2$/g may sometimes provide insufficient activity, while one with the specific surface area of over 300 m²/g provides insufficient heat stability, and thus not preferable. As one containing the cerium-zirconium-type composite oxide with a structure of a cubic crystal and/or a tetragonal structure, in addition to the above Patent Literature 1 and 2, JP-A-2004-237168 or the like is included.

(B) The Catalyst Active Metal

In the present invention, catalyst active metals (hereafter may be referred to as active metal species or metal catalyst components) may be used singly, however, because it is desirable to be stable to heat or atmosphere and to have high activity, it is preferable to be supported on the porous inorganic oxide (C), which becomes a base material. Hereafter, one combining the composite oxide (A) with the catalyst active metals (B) and porous inorganic oxide (C) and the like, may be referred to as a catalyst composition.

The metal catalyst components applicable to the present invention are not especially limited as long as it has activity to exhaust gas purification, however, it is desirable to contain one or more kind of the catalyst active metal selected from platinum, palladium or rhodium. In addition to these, a transition metal, a rare earth metal or the like may be contained.

The transition metal may include iron, nickel, cobalt, zirconium, copper or the like, and also, the rare earth metal may include a noble metal such as gold, silver, in addition to lanthanum, praseodymium and neodymium, and one or more kinds among these may be selected as appropriate.

It should be noted that, as the noble metal, it is preferable to use rhodium as an essential component and to combine at least one of platinum and palladium. In this way, $NO_x$ purification performance can be enhanced in the TWC application. In this case, it is preferable that supporting amount of the noble metal is 5 to 50% by weight, desirably 10 to 30% by weight of rhodium relative to total noble metal amount, and the remaining noble metal components are at least one kind of Pd and Pt.

That is, to exert the action as the TWC, the catalyst of the present invention preferably contains rhodium as the noble metal component, and action thereof is considered to promote a steam reforming reaction.

Action of the steam reforming reaction in $NO_x$ purification is as follows when represented by equations:

$$HC+H_2O \rightarrow CO_x+H_2 \quad (1)$$

$$H_2+NO_x \rightarrow N_2+H_2O \quad (2)$$

It has been known that because rhodium of an active metal, promotes the steam reforming reaction by a combined use with zirconium (refer WO2000/027508, page 14), this action can be utilized to reduction of $NO_x$. In the present invention also, it is considered that mechanism similar to this is generated at least partially.

Up to now, it has been considered that rhodium, when placed in exhaust gas, receives poisoning caused by CO or the like, resulting in deactivation. However, it is considered that by efficient oxidative removal of reducing components such as CO, which cause the poisoning of the rhodium surface, the cerium-zirconium-type composite oxide (A) can prevent decrease in activity of rhodium, resulting in contribution to $NO_x$ purification action, at least partially.

Use amount of the metal catalyst components depends on kinds of active metals, an inorganic base material, kinds of a structural carrier, applications of the catalyst and the like, however, in the case where the catalyst active metals are noble metals and they are used for covering the one-piece structural type carrier, the supporting amount is preferably 0.01 to 20 g/L, in particular 0.1 to 15 g/L, based on volume of the one-piece structural type carrier. The amount of the metal catalyst components over 20 g/L increases production cost of the catalyst, while the amount less than 0.01 g/L may not provide expected enhancement of purification performance of exhaust gas by using the metal catalyst components, in some cases.

(C) The Heat Resistant Inorganic Oxide

In the present invention, it is desirable that the active metal species (B) is supported on a heat resistant inorganic oxide (hereafter may be referred to as an inorganic base material or simply a base material).

That is, as the base material, on which the catalyst active metals are supported, a porous inorganic material having high heat resistance and large specific surface area is preferable, and activated alumina such as γ-alumina, O-alumina, zirconia, a cerium-zirconium composite oxide, ceria, titanium oxide, silica, various zeolites etc. may be used. Those substances added with a rare earth metal such as lanthanum, cerium, barium, praseodymium, strontium or an alkaline earth metal into such a porous inorganic base material, so as to still more enhance heat resistance, may also be used.

The base material is preferably one or more kind selected from zirconia, cerium-zirconium composite oxide, ceria, γ-$Al_2O_3$, or lanthanum-added γ-$Al_2O_3$. In particular, a catalyst, wherein the active metal species (B) contain platinum, while the heat resistant inorganic oxide (C) is lanthanum-added γ-$Al_2O_3$, is preferable. The γ-alumina added with lanthanum is excellent in heat resistance, and in the case where platinum is supported, it has been known that high catalytic activity can be maintained even at high temperature (JP-A-2004-290827). Because the cerium-zirconium-type composite oxide (A) also has excellent resistance to high temperature, by combined use with the γ-alumina added with lanthanum, a catalyst composition excellent in high temperature stability can be obtained.

As the γ-alumina, use of one having a specific surface area (by the BET method: similar hereafter) of equal to or higher than 30 m²/g is preferable, and still more use of one having a specific surface area of equal to or higher than 90 m²/g is more preferable. The specific surface area of the γ-alumina equal to or higher than 30 m²/g can stabilize the noble metals in a highly dispersed state. In addition, supporting method of the noble metals on such a γ-alumina may be carried out by a known method, as appropriate, such as mixing of an aqueous solution of a metallic salt such as chloroplatinic acid(IV), platinum(II)-diamine nitrite, solution of palatinate amine hydroxide, chloroplatinic acid, dinitrodiamine palladium, palladium nitrate, palladium chloride, rhodium(III) chloride or rhodium (III) nitrate or the like, and the γ-alumina, and then drying and firing, or the like.

It is desirable that a catalyst to be used in the automobile exhaust gas purification apparatus of the present invention, is formed as a structural type catalyst to be used in environment which can flow the exhaust gas. As such a structural type catalyst, there are included, in addition to one covered with the catalyst composition on the surface of a one-piece structural type carrier, to be described below; one covered with the catalyst composition on the surface of a pellet-like structure; a structural type catalyst formed with the catalyst composition in a pellet-like shape; or the like.

(D) The One-Piece Structural Type Carrier

In the present invention, the second catalyst is supported on the one-piece structural type carrier (for example, a honeycomb structure), which is an inorganic structural carrier.

A shape of the one-piece structural type carrier is not especially limited, and is selectable among known one-piece structural type carriers, however, it is preferable to use a flow-through-type carrier in the case of the TWC.

As a material of such a one-piece structural type carrier, a metal and ceramic are included. In the case of a metal, one made of stainless steel is general, and as the shape, one with a honeycomb shape is general. A material of the ceramic includes cordierite, mullite, alumina, magnesia, spinel, silicon carbide or the like, however, one made of cordierite is preferable, in view of having good formability in preparation of a honeycomb, and also excellent heat resistance and mechanical strength.

In addition, in addition to this, a sheet-like structure knitted with fine fibrous-substances, a felt-like incombustible structure composed of relatively large diameter fibrous-substances may also be used. It should be noted that because the one-piece structural type carriers composed of these fiber components have a large quantity of supporting amount of the metal catalyst components, and also large contacting area with exhaust gas, treatment capability can be enhanced as compared with other structural type carriers.

In the TWC applications, the flow-through-type carrier made of cordierite is preferable, in view of easiness of production, strength as a structure, suppression of pressure loss accompanied with installment of a structured catalyst (maintaining good exhaust gas venting), increase in covering amount of the catalyst composition or the like, and enhancement of stability.

An external shape of this one-piece structural type carrier is optional, and the one-piece structural type carrier such as a circular cylinder type with the cross-section of perfect circle or ellipse, a quadratic prism-type, a hexagonal column-type or the like may be selected as appropriate, corresponding to a structure of an exhaust system to be applied. Number of holes of an opening part of the one-piece structural type carrier may also be determined suitably, in consideration of kind of exhaust gas to be treated, gas flow amount, pressure loss or removal efficiency or the like, however, it is desirable to be about 10 to 1500 pieces per 1 $inch^2$, as an application of the automobile exhaust gas purification apparatus.

In a honeycomb-shaped carrier such as a flow-through-type carrier, structural characteristics thereof is represented by cell density. In the present invention, it is preferable that the honeycomb structure (D) is a flow-through-type carrier with a cell density of 10 to 1500 cell/$inch^2$ and in particular, 300 to 900 cell/$inch^2$. The cell density of equal to or higher than 10 cell/$inch^2$ can secure the contact area of exhaust gas and a catalyst necessary for purification, and providing purification performance of exhaust gas excellent in structural strength as well, while the cell density of equal to or lower than 1500 cell/$inch^2$ can secure sufficiently contact area of exhaust gas and a catalyst, without large pressure loss of exhaust gas of an internal combustion engine, and not impairing performance of an internal combustion engine. In particular, in the TWC for a gasoline engine, the flow-through-type carrier with a cell density of 300 to 900 cell/$inch^2$ is preferable, in view of suppression of pressure loss.

In the present invention, it is preferable that the second catalyst is supported on the honeycomb structure (D). It is more preferable that the catalyst composition is covered as two layers, and the lower layer thereof contains the cerium-zirconium composite oxide (A), and it is still more preferable that the cerium-zirconium composite oxide (A) is present in the same layer as Pt or Pd. In addition, still more as the TWC applications, it is preferable that the upper layer thereof is covered with the catalyst layer substantially not containing Pt and Pd and containing Rh.

Reason, which the one-piece structural type carrier is preferable to be constituted in this way, is considered as follows. That is, it is known that presence of Pt and Pd in the same composition as Rh generates a reaction of Pd and Pt with Rh, thus promoting sintering of noble metals themselves, and may weaken catalytic activity of Pt and Pd, and lower exhaust gas purification capability itself of the catalyst. In addition, it has been known that Pd has a problem of poisoning caused by lead or sulfur in exhaust gas, and presence of Pd at the surface layer of a structured catalyst declines catalytic activity. This problem can be solved by increasing amount of the noble metals, however, it raises a problem of cost increase, thus presence of Pt and Pd along with Rh in the same composition may not be preferable in some cases (refer to JP-A-11-169712, paragraph 0011, and JP-A-2005-021793, paragraph 0005).

In addition, because the cerium-zirconium-type composite oxide (A) has more dense structure, derived from a production method thereof, as compared with a cerium-zirconium-type composite oxide which is fired at lower temperature than melt temperature, it is supposed to have lower specific surface area and relatively slow oxygen discharge speed. It is considered that co-presence of Pt and Pd to such a cerium-zirconium-type composite oxide (A) promotes utilization of oxygen stored in the cerium-zirconium-type composite oxide (A) by catalytic activity of Pt and Pd, and attains activation of OSC capability.

In addition, by arrangement of Rh on the upper layer, in particular, by arrangement Rh on the surface layer of the one-piece structural type catalyst, $NO_x$ purification activity can be activated at the early stage. From these reasons, it is preferable to be the one-piece structural type catalyst having Rh arranged on the upper layer near exhaust gas, and having Pt, Pd and the cerium-zirconium-type composite oxide (A) arranged on the lower layer thereof.

As described above, in the arrangement using two catalysts in exhaust gas flow, there is the case where the two catalysts are used by making them close (it may be referred to as a tandem use), or the two catalysts are used by arrangement apart. Among these, in the case where the two catalysts are used apart, the later stage catalyst may be arranged under the floor of an automobile, which may be referred to as the under-the-floor catalyst.

In the case where the later catalyst is used apart from the former catalyst, as in the under-the-floor catalyst, temperature of exhaust gas may become low in the catalyst arranged at the later stage. In such a case, the catalyst is required to have high activity at low temperature.

For the second catalyst relevant to the present invention to have sufficient activity even at low temperature, it is preferable to make the second catalyst present in two layers, and along with Pt and Pd, a cerium-zirconium composite oxide of a pyrochlore-type structure (A), and a cerium compound of other than a pyrochlore-type structure is contained in the lower layer, and also to make the upper layer a catalyst layer substantially not containing Pt and Pd, and containing Rh. By employing such a constitution, enhancement of purification capability as the TWC at relatively low temperature can be attained.

Reason is not clear for the second catalyst relevant to the present invention to have sufficient activity even at low temperature, by taking such a constitution, however, it is considered that the following elements are factors for enhancement of activity at low temperature. That is, as a cerium compound having other than a pyrochlore structure, a cerium-zirconium-type composite oxide (A') with a cubic crystal and/or a tetragonal structure or cerium oxide with high purity or the like is included. Such a cerium compound has a rougher structure and larger specific surface area value, as compared with a pyrochlore structure. The larger specific surface area value results in the larger effective reaction surface. In the present invention, because of small specific surface area value of the cerium-zirconium-type composite oxide (A) of a pyrochlore structure to be used in the lower layer, OSC performance at low temperature may be insufficient in some cases, however, in such a case, the composite oxide (A') with large specific surface area value is considered to contribute to enhancement of OSC capability. It is considered that by utilization of OSC capability difference derived from such a structure, a catalyst having high activity even at low temperature can be obtained.

It is preferable that each component of the second catalyst is 5.0 to 200 g/L of the cerium-zirconium-type composite oxide (A), 0.01 to 20 g/L of the active metal species (B) and 1 to 300 g/L of the heat resistant inorganic oxide (C), based on unit volume of the honeycomb structure of the carrier. In addition, amount of the cerium compound having other than a pyrochlore phase, in the lower layer, is not especially limited, however, in the case of the cerium-zirconium-type composite oxide (A') with a structure of a cubic crystal and/or a tetragonal structure, it is preferable to be equal to or lower than half of the cerium-zirconium-type composite oxide (A) of the pyrochlore structure, for example, 1 to 100 g/L.

(Preparation of the Catalyst)

The metal catalyst components required to produce the second catalyst in the present invention is prepared as a compound of a nitrate, a sulfate, a carbonate, an acetate or the like. They are used, in general, by dissolving in water or an organic solvent. Subsequently, it is mixed with one or more kind of the base material (C) to support the catalyst component (B), and the cerium-zirconium-type composite oxide (A), dried, for example, at 50 to 200° C. to remove the solvent, and then fired at 300 to 1200° C. to prepare the catalyst composition. Also, in addition to the above cerium-zirconium-type composite oxide (A), a known cerium-zirconium-type composite oxide (A') other than the pyrochlore structure, or a cerium compound such as cerium oxide may be formulated.

A method for supporting the catalyst active metal on such a porous inorganic base material includes, in addition to a method for mixing and firing the porous inorganic base material and a metal salt solution; a method for mixing the composite oxide of the present invention or other components and an aqueous medium as a medium, and covering the above mixture on the surface of the one-piece-type structural carrier, and then firing; a method for covering a mixture composed of other materials excluding the metal salt on the one-piece-structural type carrier, firing and then immersing the metal salt solution; or the like. It should be noted that in mixing the catalyst components in a solution, a dispersing agent, a pH modulator or the like may be formulated.

In addition, in the catalyst to be used in the exhaust gas purification apparatus of the present invention, catalyst components having other functions, co-catalyst components, and a binder may be mixed and used, corresponding to use environment or use objects.

It is preferable that use of 5 to 200 g/L of the cerium-zirconium-type composite oxide (A), based on unit volume of the above one-piece structural type carrier, and use of 35 to 100 g/L is more preferable. The use amount over 200 g/L may generate clogging in covering the catalyst components on the honeycomb structure, in relation to use amount of the above inorganic base material or the like, and provide insufficient function in some cases, while the use amount less than 5 g/L may not provide sufficient performance in some cases.

Use amount of the inorganic base material (C) is preferably 1 to 300 g/L, and more preferably 30 to 150 g/L, based on unit volume of a one-piece structural type carrier to be described later. The use amount over 300 g/L may generate clogging in covering the catalyst components on the honeycomb structure, due to the addition of required amount of other additive components, and may provide insufficient function in some cases, while the use amount below 1.0 g/L is not capable of sufficiently dispersing the catalyst activated species in the amount required to obtain activity, and could not provide durability.

The one-piece structural type catalyst to be used in the present invention can be produced by mixing the metal catalyst components or precursors thereof, and the above porous inorganic base material or a precursor thereof along with a aqueous medium, by the above method, to prepare a slurry-like mixture, and then by applying the slurry-like mixture on the one-piece structural type carrier, and by drying and firing.

That is, firstly, by mixing the porous inorganic base material, the raw materials of the metal catalyst components and the aqueous medium in predetermined ratio, the slurry-like mixture is obtained. In the present invention, it is preferable to mix 0.01 to 25 parts by weight of the metal catalyst components relative to 100 parts by weight of the inorganic base material. The aqueous medium is used in an amount to enable uniform dispersion of the porous inorganic base material and the metal catalyst components in the slurry. In addition, the slurry may be coated with other catalyst compositions in an overlapped state, if necessary.

In preparation of the slurry, there may be formulated acids or alkalis for pH adjustment, and a surfactant and a dispersing resin etc. for viscosity adjustment or enhancement of slurry dispersing property. As a mixing method for the slurry, a crushing and mixing by a ball mill or the like is applicable, however, other crushing or mixing methods may be applied as well.

Then, the slurry-like mixture is coated on the one-piece structural type carrier. The coating method is not especially limited, however, a wash-coat method is preferable. In the wash-coat method, slurry-like mixtures are prepared in the number corresponding to layer numbers, and coating onto the one-piece structural type carrier is repeated. After the coating, by carrying out drying and firing, the one-piece structural type catalyst supported by the catalyst composition can be obtained. It should be noted that drying temperature is preferably 100 to 300° C., and more preferably 100 to 200° C. In addition, firing temperature is preferably 300 to 1200° C., more preferably 400 to 800° C. ° C., and particularly preferably 400 to 600° C. As the heating method, a known heating method such as an electric furnace or a gas furnace is used.

3. The First Catalyst

In the present invention, the first catalyst positioned at the upstream side is not especially limited, however, it is preferable to be one having oxygen occlusion and discharging function, and $NO_x$ purification function. The basic composition of the upstream side catalyst may be the same as the downstream side catalyst, which is the above described second catalyst, in basic composition and a production method, except that the basic composition of the upstream side catalyst does not require the above cerium-zirconium-type composite oxide (A), as an essential component.

As the first catalyst, for example, the cerium-zirconium-type composite oxide (A') with a structure of a cubic crystal and/or a tetragonal structure, substantially not containing a pyrochlore phase, is included. In particular, it is a preferable one with the specific surface area of 10 to 300 m$^2$/g. One having the specific surface area of smaller than 10 m$^2$/g may not exhibits sufficient activity as the first catalyst in some cases, while one having the specific surface area of over 300 m$^2$/g has insufficient thermal stability, and thus not preferable. As one containing the cerium-zirconium-type composite oxide with a structure of a cubic crystal and/or a tetragonal structure, in addition to the above Patent Literature 1 and 2, JP-A-2004-237168 and the like are included.

The cerium-zirconium-type composite oxide (A') with a structure of a cubic crystal and/or a tetragonal structure substantially not containing a pyrochlore phase, is preferably one obtained by firing a cerium salt and a zirconium salt of raw materials, under condition not generating a melt substance. A method for obtaining the cerium-zirconium-type composite oxide without making a cerium element material and a zirconium element material in a melt state, is not especially limited, and it may be obtained, for example, by a method for mixing an cerium salt solution and a zirconium salt solution, and then through the steps of drying, firing and crushing; as well as by a method such as a co-precipitation method. In addition, it may be obtained also by utilization of a part of the steps, excluding the melting step, or all of the steps among the above production method for the cerium-zirconium-type composite oxide (A). It should be noted that cerium oxide may include impurities derived from the raw materials, however, it is one composed of substantially a cerium oxide. A method for obtaining such a cerium-type oxide is not especially limited, for example, it is obtained by firing and crushing a cerium salt. It should be noted that commercially available one may be used as such a cerium-zirconium-type composite oxide and cerium oxide It should be noted that in the upstream side catalyst, other catalyst materials described in the explanation of the downstream side catalyst, may be used. That is, the upstream side catalyst may further contain one or more kind of active metal species (B) selected from platinum, palladium or rhodium, and also it is preferable that the active metal species (B) are supported on the one or more kind of heat resistant inorganic oxide (C) selected from zirconia, $\gamma$-$Al_2O_3$, or lanthanum-added $\gamma$-$Al_2O_3$, and still more the upstream side catalyst is covered onto the honeycomb structure (D). In particular, the one-piece structural type catalyst covered the catalyst components on a flow-through structural carrier made of cordierite is desirable. In addition, this cover of the catalyst components may be a single coat, however, it may be a covered-state having overlapped two or more layers of different catalyst compositions. In this case, the above catalyst compositions may be a top coat layer directly contacting with exhaust gas, or an under coat layer to be covered thereunder.

In addition, it is preferable that each of components of the upstream side catalyst of the first catalyst is 5.0 to 200 g/L of the cerium-zirconium-type composite oxide (A'), 0.01 to 20 g/L of the active metal species (B) and 1 to 300 g/L of the heat resistant inorganic oxide (C), based on unit volume of the honeycomb structure (D).

4. The Exhaust Gas Purification Method

The exhaust gas purification method of the present invention is characterized in that a nitrogen oxide ($NO_x$) contained in exhaust gas is decomposed, by using the above automobile exhaust gas purification apparatus, and by having exhaust gas of an internal combustion engine sequentially contacted with catalysts which are arranged at least at two places of the upstream side and the downstream side of an exhaust gas passage.

The catalyst system to be used in the automobile exhaust gas purification apparatus of the present invention is, as described above, a catalyst system composed by using two or more exhaust gas purification catalysts, containing a first catalyst supported on an inorganic structural carrier, and a second catalyst other than this, and having the first catalyst supported on a part of the inorganic structural carrier positioned at the upstream side, when arranged in an exhaust gas passage; on the other hand, having the second catalyst supported on a part of the inorganic structural carrier positioned at the downstream side, when arranged in an exhaust gas passage; and containing a cerium-zirconium-type composite oxide (A) having a pyrochlore phase in the crystal structure.

The at least two catalysts are arranged at the upstream side and the downstream side of an exhaust gas passage, however, it is preferable that the catalysts themselves are arranged adjacently, and for at least the downstream side catalyst, the cerium-zirconium-type composite oxide (A) containing a pyrochlore phase in the crystal structure is used as the OSC.

Such a cerium-zirconium-type composite oxide (A) may be one obtained by melting a raw material mixture under heating at equal to or higher than melting point thereof, and then by crushing an ingot formed by cooling.

The exhaust gas purification method of the present invention is one to purify $NO_x$ contained in exhaust gas, by flowing exhaust gas through the upstream side catalyst and the downstream side catalyst, and is applicable also to the case where the downstream side catalyst is used as the under-the-floor catalyst. In the present invention, it is particularly preferable that it is used so that the downstream side catalyst becomes high temperature, by arranging the upstream side catalyst and the downstream side catalyst adjacently at a discharge passage of exhaust gas, or by making consideration so that the downstream side catalyst is easily warmed or the like.

In addition, in particular, when it is used as the TWC of the automobile exhaust gas purification apparatus, it exerts excellent effect in $NO_x$ purification, and excellent purification performance of $NO_x$ in exhaust gas generated by occurrence of a lean state, in particular, accompanying with variation of air/fuel ratio. That is, it is preferable that the internal combustion engine is a gasoline engine, and is operated in a state of theoretical air/fuel ratio, or operated under variation from a rich state to a lean state of air/fuel ratio. In this way, in the case where the automobile exhaust gas purification apparatus of the present invention is used as the TWC apparatus, the nitrogen oxide (NO.) is reduced by a hydrocarbon (HC), carbon monoxide (CO) or hydrogen (H) generated by a steam reforming reaction. Each catalyst is preferably the one-piece structural type catalyst prepared by the above method.

In addition, the exhaust gas purification method of the present invention exerts characteristic effect, when it is used in environment for operation under variation of air/fuel ratio, such as frequent fuel cut during engine operation, or frequent operation in a significantly lean state.

Variation of air/fuel ratio in an internal combustion engine leads to variation of HC concentration in exhaust gas, and such variation of HC concentration is considered to provide suitable environment where exhaust gas purification capability of the present invention is exerted. Reason for exerting such action is not certain, however, it is predicted that there is contribution of the following actions as well.

A desirable embodiment of the automobile exhaust gas purification apparatus of the present invention is one where both the upstream side catalyst and the downstream side catalyst are the TWC, and the cerium-zirconium-type composite oxide produced at temperature equal to or lower than melting point, is used at the upstream side TWC, and this cerium-zirconium-type composite oxide is known as the OSC. In this case, there may be the case where purification performance of exhaust gas of the upstream side TWC is superior in reduction performance of HC and CO, as compared with purification performance of exhaust gas of the downstream side TWC, by the following factors.

That is, in many cases, the OSC to be used at the upstream side TWC is the cerium-zirconium-type composite oxide (A')

produced at relatively low temperature, and has larger specific surface area value, as compared with the cerium-zirconium-type composite oxide (A) to be used at the downstream side, which is a melt substance produced at high temperature. And, it is considered that because of large active surface as the OSC derived therefrom, a catalyst with particularly high oxidation activity tends to be produced easily.

In cerium-type oxide particles and cerium-zirconium-type composite oxide particles, it is considered that a moiety, where oxygen occlusion and discharging is effectively carried out as the OSC, is down to a certain depth from the particle surface. This means the OSC having larger specific surface area value has more components acting effectively in oxygen occlusion and discharging, and it can be said that use of the OSC with larger specific surface area value as the upstream side TWC tends to make a catalyst with higher activity, as compared with the downstream side TWC. In other words, in the automobile exhaust gas purification apparatus of the present invention, it can be said that a catalyst with excellent purification capability is arranged at the upstream side, and a catalyst with inferior tendency thereto is arranged at the downstream side, is a desirable embodiment.

In the downstream side catalyst to be used in the present invention in this way, powder produced by crushing a composite oxide obtained by mixing a cerium component and a zirconium component and desirably cerium oxide and zirconium oxide, and heating to a degree to attain a melt state, is used as the catalyst components. On the other hand, any of the conventional catalysts (OSC materials) described in the above Patent Literature 1, uses a composite oxide produced by mixing a cerium salt and a zirconium salt and firing at a temperature of equal to or lower than 1000° C., or up to 1300° C. at the highest. Accordingly, it is an astonishing fact that characteristic $NO_x$ purification performance is exerted and a more excellent automobile exhaust gas purification apparatus can be provided, by combination of a catalyst with apparently high performance and a catalyst with not so high performance, in view of specific surface area value.

It should be noted that, in the automobile exhaust gas purification apparatus of the present invention, in addition to a combination of the above upstream side catalyst, design variation can be employed as appropriate, by still more combination of a catalyst having similar function to the upstream side catalyst, or a totally different catalyst, as the latter catalyst of the downstream catalyst, or the like.

In this way, environment accompanied by variation of HC concentration in exhaust gas is not limited to the above condition, and it is considered also HC-SCR (Selective Catalytic Reduction) etc. to be used in $NO_x$ purification in exhaust gas from a diesel engine, using the HC as a reducing agent. HC-SCR is one for purifying $NO_x$ in exhaust gas from lean combustion, by using the HC as a reducing agent, and HC to be used here is supplied by temporarily decreasing air/fuel ratio of fuel-mixed air supplied into a combustion chamber so as to increase HC concentration in exhaust gas, or by spraying the fuel directly into exhaust gas.

In the present invention, a catalyst containing the cerium-zirconium-type composite oxide (A) should not be used singly but generally two or more catalysts should be used in a recent catalyst for the automobile exhaust gas purification apparatus. Accordingly, study on new catalyst layout is not necessary, and it is easily applicable to a conventional automobile or an automobile to be commercialized in the future.

As such operation environment, the above HC-SCR or the like is considered, in addition to the TWC, and it can be used widely in purification of $NO_x$ in automobile exhaust gas. The present invention is preferably used in purification of exhaust gas components discharged from an gasoline engine, however, as exhaust gas components to be purified, purification subjects may also be fossil fuel such as diesel, LPG, those discharged from an automotive internal combustion engine using bio fuel such as ethanol as fuel, or exhaust gas discharged from a boiler, a gas turbine or the like.

EXAMPLES

Characteristics of the present invention will be made still more clearly below with reference to Examples and Comparative Example. It should be noted that the present invention should not be limited to embodiment these Examples. It should be noted that each of catalyst components was prepared by the methods shown below.
[The Cerium-Zirconium-Type Composite Oxide (A)]

Figure 2:
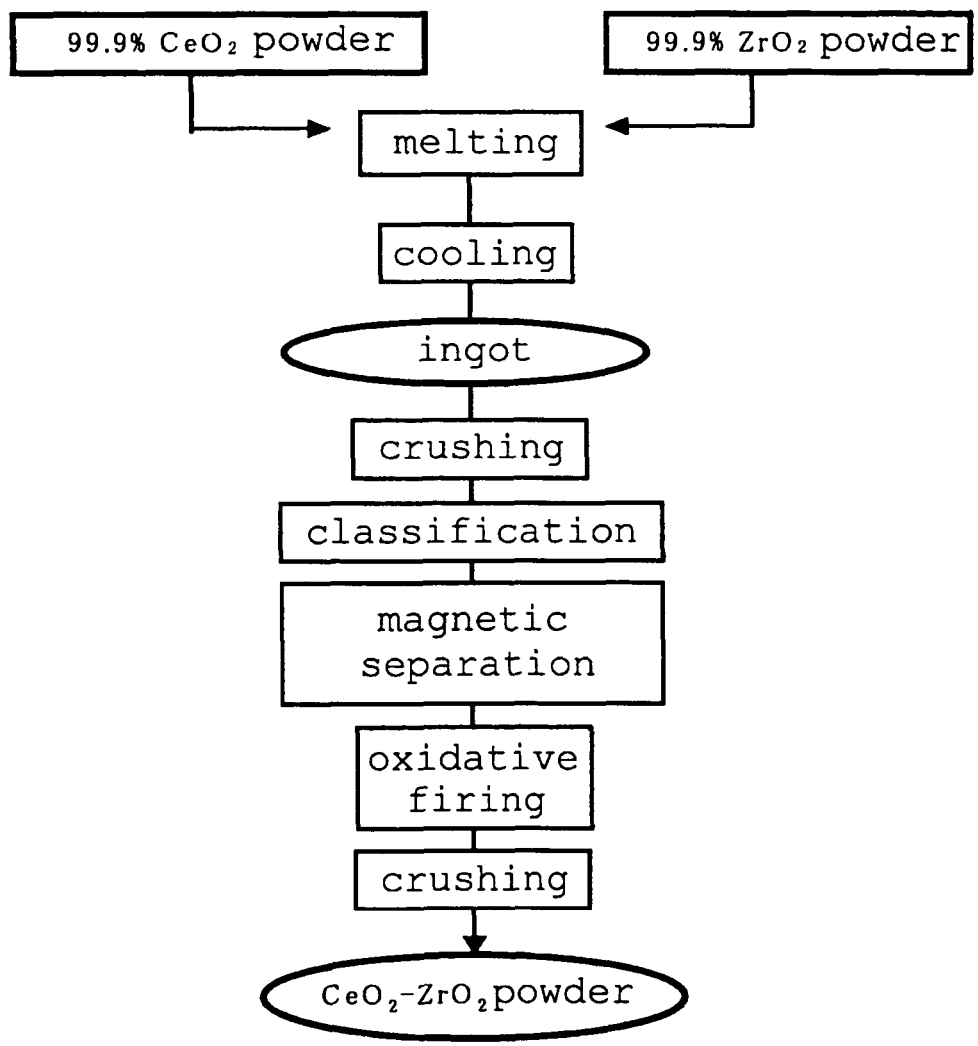
FIG. 2 is a flow sheet showing steps (procedures) to produce the cerium-zirconium composite oxide of a component of the downstream side catalyst in the present invention.

By using high purity zirconium oxide (a purity of 99.9%) as a raw material of Zr, and high purity cerium oxide (a purity of 99.9%) as a raw material of Ce, powder of the cerium-zirconium-type composite oxide of the present invention was produced according to procedure of production steps shown in FIG. 2.

Firstly, in order to prepare 10 kg of the powder, the high purity zirconium oxide (4.2 kg) and the high purity cerium oxide (5.8 kg) were sampled and mixed, and subjected to melting at equal to or higher than 2250° C., using an arc-type electric furnace under condition of a secondary voltage of 85 V, an average load power of 99.5 kW, a welding time of 2 hours and applying a total electric energy of 182 kWh.

It should be noted that to promote initial stage energization, 500 g of coke was used. After completion of the melting, the electric furnace was covered with a carbon lid, and an ingot was obtained by gradual cooling for 24 hours in air atmosphere. The resulting ingot was crushed with a jaw crusher or a roll crusher, down to a size of 3 mm, and then powder with a size of equal to or smaller than 1 mm was collected using a sieve to obtain the present cerium-zirconium-type composite oxide.

Figure 3:
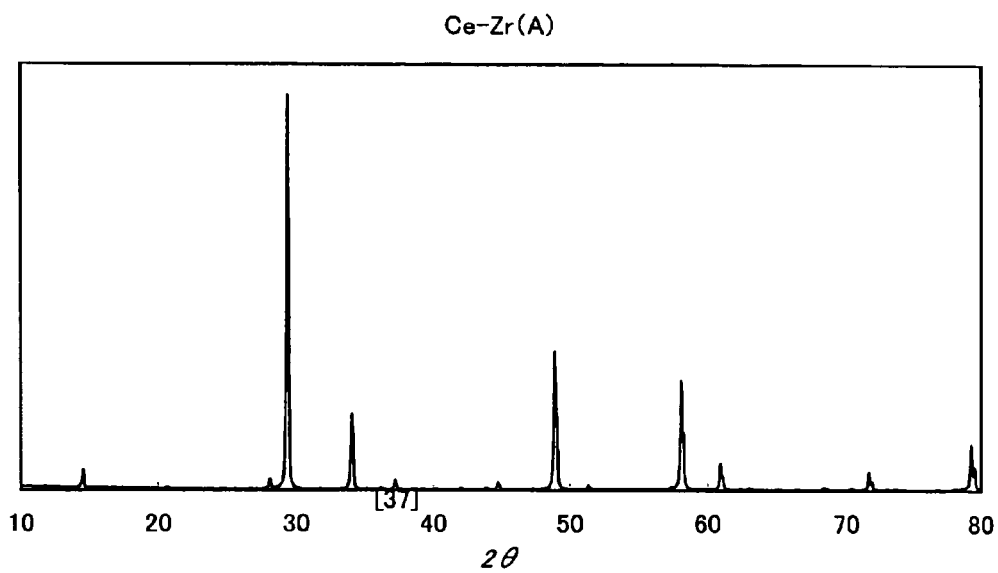
FIG. 3 is a graph showing an X-ray diffraction apparatus (XRD) data represented a crystal structure of the cerium-zirconium composite oxide (A) containing a pyrochlore phase relevant to the present invention.

Next, in order to remove a suboxide in the melting step or a strain inside crystal due to super-cooling, it was subjected to firing at 800° C. for 3 hours in air atmosphere, using the electric furnace, and crushing with a planet mill for 10 minutes to obtain powder with an average particle size of 1.3 μm. The average particle size was analyzed with a laser diffraction scattering apparatus (LS230, manufactured by COULTER Co., Ltd.). By this analysis with XRD, it was confirmed that a pyrochlore phase is contained singly in the crystal structure (FIG. 3). In addition, specific surface area was 1.3 m²/g. Hereafter, this may be referred to as [Ce—Zr(A)].
[The Cerium-Zirconium-Type Composite Oxide (A')]

Commercially available cerium nitrate (a purity of 99.0%) and zirconium oxynitrate (a purity of 99.0%) were dissolved in ion-exchanged water to prepare an aqueous solution of 20% by weight as converted to $CeO_2$ and 25% by weight as converted to $ZrO_2$.

Then, each of nitrate solutions required to prepare a composite oxide composed of 58% by weight of $CeO_2$ and 42% by weight of $ZrO_2$, was mixed, and 5% ammonia water was added to make pH=10.2 finally, and cerium hydroxide and zirconium hydroxide were co-precipitated.

Figure 4:
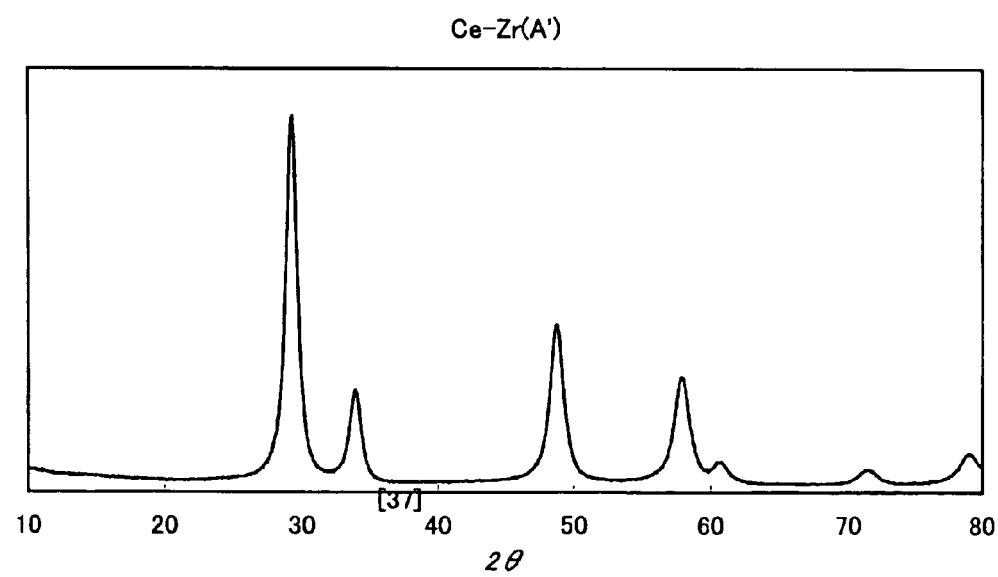
FIG. 4 is a graph showing an X-ray diffraction apparatus (XRD) data representing a crystal structure of the cerium-zirconium composite oxide (A') for comparison.

Then, after carrying out suction filtration, it was washed with pure water. This was fired at 500° C. for 2 hours to obtain the cerium-zirconium-type composite oxide. Subsequently, via similar steps as in the production of the present cerium-zirconium-type composite oxide, a non-melt-type cerium-zirconium-type composite oxide with a particle size of equal to or smaller than 2.0 μm, was obtained. This was confirmed by XRD to contain a tetragonal structure singly in the crystal structure (FIG. 4). In addition, specific surface area was 74 m²/g. Hereafter, this may be referred to as [Ce—Zr(A')].

[Noble Metal Component Supported by γ-Alumina]

Commercially available lanthanum-added γ-$Al_2O_3$ (specific surface area: 220 m²/g, $Al_2O_3/La_2O_3$ (weight ratio) =98.4/1.6) was subjected to impregnation treatment with a 20% by weight aqueous solution of platinum(II)-diamine nitrite, as well as a 8% by weight aqueous solution of rhodium nitrate, and then by drying and removing water, powder of a platinum-supported catalyst component was obtained. Hereafter, this may be referred to as La-γ-alumina. As for palladium, it was subjected to impregnation treatment with a 28% by weight aqueous solution of dinitrodiamine palladium. It should be noted that as zirconium and ceria, which are other components, each of commercially available ones with purity of 99.9% were used.

Example 1

Catalyst slurry was prepared by adjusting the component amount so that the above catalyst materials become the predetermined coating amount, based on unit volume of the following one-piece structural carrier, and by mixing with suitable amount of aqueous medium for 5 hours with a ball mill. Thus prepared slurry was coated on the one-piece structural type carrier by a wash-coat method. Two-coat structure was obtained by coating the second catalyst layer on the first catalyst layer. This was subjected to drying, and firing at 500° C. for 1 hour to obtain the one-piece structural type catalyst. Coated amount of catalyst components, based on unit volume, contained in each layer, is shown in Table 2. It should be noted that values in Table 2 represent "g/L".

<The One-Piece Structural Carrier>

Kind of the one-piece structural type catalyst: A flow-through-type carrier

Volume of the one-piece structural type catalyst: 645 cc (height: 95 mm*diameter: 93 mm)

Material of the one-piece structural type catalyst: Cordierite

Cell density of the one-piece structural type catalyst: 600 cell/inch²

Cell wall thickness of the one-piece structural type catalyst: 4 mil

Example 2

Catalyst slurry was prepared by adjusting the component amount so that the above catalyst materials become the predetermined coating amount, based on unit volume of the following one-piece structural carrier, and by mixing with suitable amount of aqueous medium for 5 hours with a ball mill. Thus prepared slurry was coated on the one-piece structural type carrier by a wash-coat method. Similarly as in Example 1, except that coating was changed to a single coat, the one-piece structural type catalyst was obtained. Coated amount of catalyst components, based on unit volume is shown in Table 2.

Although two catalysts containing the cerium-zirconium-type composite oxide (A) of a melting-type at high temperature, of Example 1, were used to constitute an apparatus as the TWC, target value of $NO_x$ purification rate was not attained. Accordingly, using this as the downstream side catalyst (Table 2), and a conventional TWC catalyst (Table 1) was arranged at the upstream side thereof. Similarly also in the catalyst of Example 2, this was used as the downstream side catalyst (Table 2), and a conventional TWC catalyst (Table 1) was arranged at the upstream side thereof. Purification performance as the TWC was measured on a catalyst apparatus for exhaust gas purification of FIG. 1, where this one-piece structural type catalyst was arranged. Measurement conditions were in accordance with the following conditions:

[Measurement Conditions]

An engine for evaluation: NA 2.4 L gasoline engine

A measurement mode: The FTP (Federal Test Procedure) mode. This is a running test mode specified by the U.S. Environmental Protection Agency to be used for evaluation of purification capability of exhaust gas.

A measurement apparatus of exhaust gas: MEXA7000, manufactured by HORIBA Co., Ltd.

Arrangement of the catalyst: Under floor.

As a result of total bag in the FTP mode, purification performances of $NO_x$ and HC (THC) in Example 1 were 0.010 g/mile, 0.013 g/mile, respectively, and CO (1/10) was 0.031 g/mile. In Example 2, $NO_x$ did not decrease so significantly as in Example 1, and was 0.018 g/mile. "THC" represents total hydrocarbon, and "CO (1/10)" represents value when CO value in total bag is set at 1/10, for convenience.

In addition, mutual relation between timing of fuel cut (F/C) and $NO_x$ purification performance under the above measurement conditions was measured on Example 1 and Comparative Example 1. An instantaneous maximal value of $NO_x$ discharge amount was measured by carrying out F/C after running under the following condition.

[Running Condition]

Km per hour: 60 km/h (normal)

Air/fuel ratio (A/F): 14.2

Normal running time: 20 seconds

As a result, the instantaneous maximal value of $NO_x$ discharge amount in Example 1 was 0.000055/ppm, while the instantaneous maximal value of $NO_x$ exhaustion amount in Comparative Example 1 was 0.000116/ppm. As is clear from these, there was two times or more difference of $NO_x$ discharge amount after F/C between Example 1 and Comparative Example 1. In addition, this tendency was observed similarly also in other than the maximal value.

TABLE 1

|  |  | Upstream side catalyst | |
| --- | --- | --- | --- |
|  |  | 1st layer (g/L) | 2nd layer (g/L) |
| Active metal | Pd | 3 | 6 |
|  | Rh | 0.6 | — |
| Heat resistant inorganic substance | La-γ-alumina | 80 | 33 |
|  | Zirconia | — | — |
|  | Ce—Zr (A') | 35 | 20 |
|  | Ce—Zr (A) | — | — |
|  | Ceria | — | — |

TABLE 2

|  |  | Downstream side catalyst (Ex. 1) | | | Downstream side catalyst (Comp. Ex. 1) | |
| --- | --- | --- | --- | --- | --- | --- |
|  |  | 1st layer (g/L) | 2nd layer (g/L) | Ex. 2 (g/L) | 1st layer (g/L) | 2nd layer (g/L) |
| Active metal | Pd | 1.2 | — | 1.2 | 1.2 | — |
|  | Rh | — | 0.4 | 0.4 | — | 0.4 |
| Heat | La-γ-alumina | 39 | — | 39 | 40 | 25 |

TABLE 2-continued

|  | Downstream side catalyst (Ex. 1) | | | Downstream side catalyst (Comp. Ex. 1) | |
|---|---|---|---|---|---|
|  | 1st layer (g/L) | 2nd layer (g/L) | Ex. 2 (g/L) | 1st layer (g/L) | 2nd layer (g/L) |
| resistant inorganic substance Zirconia | — | 30 | — | — | 25 |
| Ce—Zr (A) | 77 | — | 77 | — | — |
| Ce—Zr (A') | — | 30 | — | — | 10 |
| Ceria | — | — | — | 77 | — |

Comparative Example 1

A catalyst was prepared similarly as in Example 1, except that a catalyst containing the tetragonal structure cerium-zirconium-type composite oxide (A') was used, as the downstream side catalyst (Table 2). The upstream side catalyst (Table 1) is a conventional TWC, the same as in Example 1.

Purification performance as the TWC was measured on a catalyst apparatus for exhaust gas purification, where this one-piece structural type catalyst was arranged. As a result, $NO_x$, and HC were 0.030 g/mile and 0.020 g/mile, respectively, and CO (1/10) was 0.050 g/mile.

Examples 3 and 4

One-piece structural type catalysts were obtained by using the catalyst materials used in Example 1 and a similar method as in Example 1, and by using a catalyst composition containing Ce—Zr (A) as the downstream side catalyst in Example 3, and by using a catalyst composition containing Ce—Zr (A') and Ce—Zr (A) in Example 4. Coated amounts of catalyst components, based on unit volume, contained in each layer, are shown in Table 3 and Table 4. contained in each layer. Table 3 shows composition of the upstream side catalyst, and Table 4 shows composition of the downstream side catalyst. It should be noted that value in Tables 3 and 4 show "g/L".

[The One-Piece Structural Carrier for the Upstream Side Catalyst]
Kind of the one-piece structural type catalyst: A flow-through-type carrier
Volume of the one-piece structural type catalyst: 550 cc (height: 50 mm×diameter: 118.4 mm)
Material of the one-piece structural type catalyst: Cordierite
Cell density of the one-piece structural type catalyst: 900 cell/inch$^2$
Cell wall thickness of the one-piece structural type catalyst: 2.5 mil

[The One-Piece Structural Carrier for the Downstream Side Catalyst]
Kind of the one-piece structural type catalyst: A flow-through-type carrier
Volume of the one-piece structural type catalyst: 1002 cc (height: 91 mm×diameter: 118.4 mm)
Material of the one-piece structural type catalyst: Cordierite
Cell density of the one-piece structural type catalyst: 600 cell/inch$^2$
Cell wall thickness of the one-piece structural type catalyst: 4.3 mil

TABLE 3

|  |  | Upstream side catalyst | |
|---|---|---|---|
|  |  | 1st layer (g/L) | 2nd layer (g/L) |
| Active metal | Pt | 0.4 | |
|  | Pd | 1.6 | 3.2 |
|  | Rh | 0.2 | 0.2 |
| Heat resistant inorganic substance | La-γ-alumina | 45 | 50 |
|  | Zirconia | 5 | 3 |
| Ce—Zr (A) |  |  |  |
| Ce—Zr (A') |  | 25 | 10 |

TABLE 4

|  |  | Downstream side catalyst (Ex. 3) | | Downstream side catalyst (Ex. 4) | |
|---|---|---|---|---|---|
|  |  | 1st layer (g/L) | 2nd layer (g/L) | 1st layer (g/L) | 2nd layer (g/L) |
| Active metal | Pt | 0.1 |  | 0.1 |  |
|  | Pd | 0.5 |  | 0.5 |  |
|  | Rh |  | 0.3 |  | 0.3 |
| Heat resistant inorganic substance | La-γ-alumina | 39 | 25 | 39 | 25 |
|  | Zirconia |  | 3 |  | 3 |
| Ce—Zr (A) |  | 78 |  | 39 |  |
| Ce—Zr (A') |  |  | 35 | 39 | 35 |

As for Examples 3 and 4 obtained in this way, this one-piece structural type catalyst was arranged as the downstream side catalyst, different from FIG. 1, at the place positioned under the floor of an automobile, apart from the upstream side catalyst to constitute a catalyst apparatus for exhaust gas purification. Subsequently, by varying air/fuel ratio (A/F), purification performance at low temperature as the TWC, was measured. Measurement conditions were in accordance with the following conditions. Results are shown in FIG. 5.

Figure 5:
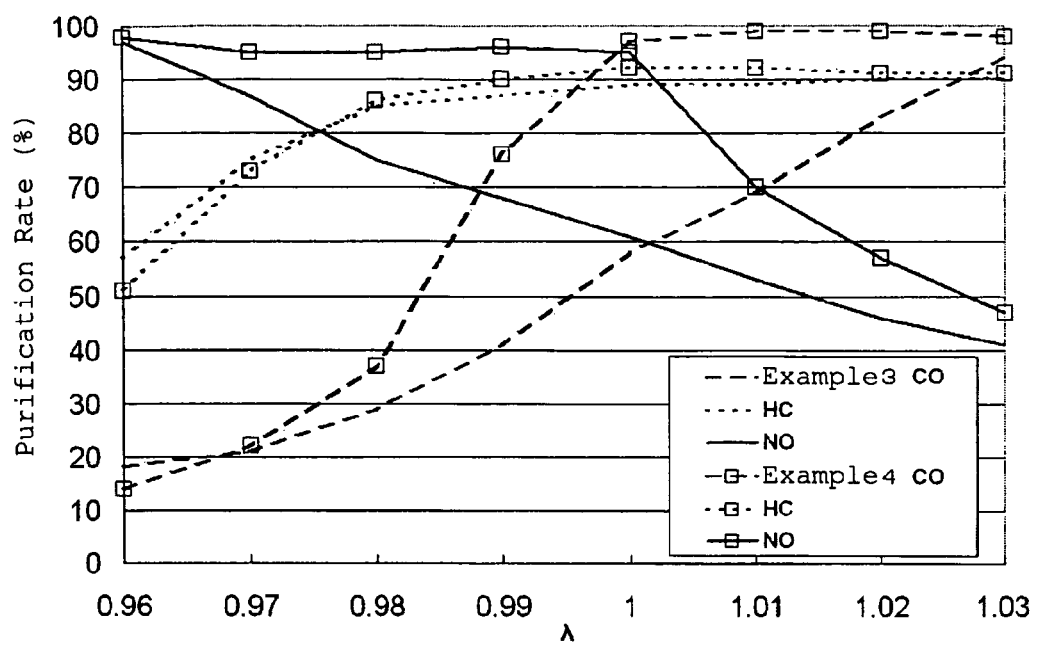
FIG. 5 is a graph showing catalytic performance in the case where Ce—Zr (A') is added to a lower layer Ce—Zr (A), as a component of the downstream side catalyst in the present invention.

In FIG. 5, λ represents air excess ratio and means ratio of practical air/fuel ratio and stoichiometric air/fuel ratio. This may also be called standard air/fuel ratio. Air/fuel mixture composed stoichiometrically has the air excess ratio of λ=1. Air/fuel mixture composed with stoichiometrically excess amount is said "lean" and has the air excess ratio of λ>1, however, air/fuel ratio mixture composed with stoichiometrically deficient amount has the air excess ratio of λ<1.

In addition, perturbation in the following measurement conditions means to modulate air/fuel ratio to a lean state and a rich state. By carrying out the perturbation control, emission characteristics of an internal combustion engine can be improved or maintained. In the case of the lean state of air/fuel ratio in exhaust gas, a catalyst attains purification (reduction) by occluding excess oxygen in exhaust gas, while in the case of the rich state of air/fuel ratio in exhaust gas, a catalyst attains exhaust gas purification by discharging occluded oxygen so as to oxidize unburned components.

In the above perturbation control, air/fuel ratio is modulated repeatedly to a rich state or a lean state, so as to repeat a state where all of the occluded oxygen in the catalyst is discharged, and a state where oxygen is occluded by the catalyst to a maximal degree of the capability. It is known that by repeating such states, catalyst activity is enhanced and oxygen occluding capability thereof is increased. In the following measurement conditions, under modulating the air/fuel ratio by only 1 at a frequency of 1 Hz, purification rate was measured, with the center thereof being γ, in a range of =0.96 to 1.03.

[Measurement Conditions]

An engine for evaluation: 2.0-L, 4-cylinder gasoline engine

Measurement condition: An engine ration number of 2700 rpm, boost pressure of −270 mmHg A measurement apparatus of exhaust gas: MEXA7500, manufactured by HORIBA Co., Ltd.

Arrangement of the catalyst: Under the floor.

Inlet gas temperature of the downstream catalyst: 400° C. (FIG. 5)

Perturbation: ±1.0/1.0 Hz; modulated from a rich side to a lean side.

[Results]

In FIG. 5, in Example 3, a CO/$NO_x$ crossover conversion at the vicinity of λ=1 is about 60%, while in Example 4, the CO/$NO_x$ crossover conversion at the vicinity of λ=1 is about 90%. The crossover conversion is used as an index representing purification performance of the TWC catalyst, by those skilled in the art. In FIG. 5, an intersecting point of graphs representing variation of conversion of oxidizing components and reducing components is employed as the cross-purification rate.

Components to be purified in exhaust gas are purified with the reducing components as for the oxidizing components, and with the oxidizing components as for the reducing components. In other words, it can be said a preferable state for purification by the TWC that both of the oxidizing components and the reducing components are present in good balance. From such a reason, the crossover conversion is used as a guideline of general purification performance.

[Evaluation]

It is understood that in Example 1, because a catalyst containing the cerium-zirconium-type composite oxide (A) of a melting-type at high temperature was used as the downstream side catalyst, $NO_x$ purification performance is excellent, as well as purification performance of each exhaust gas component of HC, CO and $NO_x$ equal to or higher than a catalyst used in Comparative Example 1 is exerted.

In the case of Example 2, $NO_x$ was reduced significantly as compared with Comparative Example 1, however, effect thereof was not so significant as in Example 1. In addition, according to the present invention, it was understood that excellent action effect was exerted in reduction of $NO_x$ concentration in exhaust gas after fuel cut.

In addition, in the case of employing the downstream side catalyst as the under-the-floor catalyst, even in Example 3 containing Ce—Zr(A) in the lower layer, a certain degree of performance is exerted, however, in Example 4, because Ce—Zr(A') is added to Ce—Zr(A) in the lower layer, activity at low temperature as the TWC is enhanced.

The automobile exhaust gas purification apparatus of the present invention can be utilized as an apparatus for efficiently purifying $NO_x$ in automobile exhaust gas. In addition, it is useful as an apparatus for purifying HC, CO and $NO_x$, as toxic components in exhaust gas, in environment where HC concentration varies, and in particular, when used as the TWC, excellent purification performance to $NO_x$ is exerted.

What is claimed is:

1. A catalyst system to be used in an automobile exhaust gas purification apparatus, comprised of using two or more exhaust gas purification catalysts comprising a first catalyst supported on a honeycomb structure (D), and a second catalyst other than the first catalyst, characterized in that:

the first catalyst is supported on a part of the honeycomb structure (D) positioned at an upstream side when arranged in an exhaust gas passage;

the first catalyst comprises a cerium-zirconium-type composite oxide (A') with a structure of a cubic crystal and/or a tetragonal structure, not comprising a pyrochlore phase;

the second catalyst is supported on a part of the honeycomb structure (D) positioned at a downstream side when arranged in an exhaust gas passage;

the second catalyst comprises a cerium-zirconium-type composite oxide (A) having a pyrochlore phase in the crystal structure and the cerium-zirconium-type composite oxide (A');

the second catalyst is covered as at least two layers on the honeycomb structure (D) and the cerium-zirconium-type composite oxide (A) and the cerium-zirconium-type composite oxide (A') are supported on the lower layer; and the second catalyst further comprises one or more kinds of active metal species (B) selected from platinum, palladium, or rhodium wherein platinum and palladium are in the lower layer and rhodium is in the upper layer.

2. The catalyst system according to claim 1, characterized in that the first catalyst and the second catalyst are arranged adjacently.

3. The catalyst system according to claim 1, characterized in that the first catalyst and the second catalyst have a function to reduce a nitrogen oxide ($NO_x$) by a hydrocarbon (HC) or carbon monoxide (CO) or hydrogen (H).

4. The catalyst system according to claim 1, characterized in that particle size of the cerium-zirconium-type composite oxide (A) is equal to or smaller than 3 mm.

5. The catalyst system according to claim 1, characterized in that cerium and zirconium of the cerium-zirconium composite oxide (A) is contained in a ratio of $CeO_2/(ZrO_2+CeO_2)$ =1/9 to 9/1, based on molar ratio as converted to an oxide.

6. The catalyst system according to claim 1, characterized in that the active metal species (B) are supported on a heat resistant inorganic oxide (C) comprising one or more kind selected from zirconia, the cerium-zirconium composite oxide, ceria, γ-$Al_2O_3$, or lanthanum-added γ-$Al_2O_3$.

7. The catalyst system according to claim 6, characterized in that the active metal species (B) comprise platinum, while the heat resistant inorganic oxide (C) is composed of lanthanum-added γ-$Al_2O_3$.

8. The catalyst system according to claim 1, characterized in that the honeycomb structure (D) is a flow-through-type carrier with a cell density of 10 to 1500 cell/inch$^2$.

9. The catalyst system according to claim 1, characterized in that the second catalyst comprises 5.0 to 200 g/L of the cerium-zirconium-type composite oxide (A), 0.01 to 20 g/L of an active metal species (B) and 1 to 300 g/L of a heat resistant inorganic oxide (C), based on unit volume of the honeycomb structure (D).

10. The catalyst system according to claim 1, characterized in that specific surface area of the cerium-zirconium-type composite oxide (A') is 10 to 300 m$^2$/g.

11. The catalyst system according to claim 1, characterized in that the first catalyst further comprises one or more kind of active metal species (B) selected from platinum, palladium or rhodium.

12. The catalyst system according to claim 11, characterized in that the active metal species (B) are supported on a heat resistant inorganic oxide (C) comprising one or more kind selected from zirconia, γ-$Al_2O_3$, or lanthanum-added γ-$Al_2O_3$.

13. The catalyst system according to claim 1, characterized in that the inorganic structural carrier is a honeycomb structure (D); and the first catalyst comprises 5.0 to 200 g/L of the cerium-zirconium-type composite oxide (A'), 0.01 to 20 g/L of an active metal species (B) and 1 to 300 g/L of a heat resistant inorganic oxide (C), based on unit volume of the honeycomb structure (D).

14. An automobile exhaust gas purification apparatus comprising the catalyst system according to claim 1.

15. An exhaust gas purification method characterized by decomposing a nitrogen oxide ($NO_x$) contained in an exhaust gas of an internal combustion engine by contacting the exhaust gas with the automobile exhaust gas purification apparatus according to claim 14 and by subjecting the exhaust gas to sequential contacting with catalysts arranged at least two places selected from an upstream side and a downstream side of an exhaust gas passage.

16. The exhaust gas purification method according to claim 15, characterized in that the nitrogen oxide ($NO_x$) is reduced by hydrogen (H) generated by a steam reforming reaction or a water gas shift reaction, derived from a hydrocarbon (HC) or carbon monoxide (CO).

17. The exhaust gas purification method according to claim 15, characterized in that the internal combustion engine is a gasoline engine.

* * * * *